United States Patent [19]
Fothen

[11] Patent Number: 5,720,426
[45] Date of Patent: Feb. 24, 1998

[54] METHOD OF WAVE-SOLDERING ASSEMBLED UNITS

[75] Inventor: Manfred Fothen, Willich, Germany

[73] Assignee: U.S. Philips Corporation, New York, N.Y.

[21] Appl. No.: 627,555

[22] Filed: Apr. 4, 1996

[30] Foreign Application Priority Data

Apr. 6, 1995 [DE] Germany .................. 195 12 902.4

[51] Int. Cl.$^6$ .................. B23K 3/06; H05K 3/34
[52] U.S. Cl. .................. 228/260; 228/37
[58] Field of Search .................. 228/37, 180.1, 228/180, 21, 260

[56] References Cited

U.S. PATENT DOCUMENTS

| | | | |
|---|---|---|---|
| 5,156,324 | 10/1992 | Hueste et al. | 228/260 |
| 5,228,614 | 7/1993 | Elliott et al. | 228/37 |
| 5,292,055 | 3/1994 | Gileta | 228/180.1 |
| 5,379,931 | 1/1995 | Van Schaik | 228/37 |

FOREIGN PATENT DOCUMENTS

| | | | |
|---|---|---|---|
| 1190095 | 7/1985 | Canada | 228/37 |
| 0621101A1 | 10/1994 | European Pat. Off. | |
| 627933 | 10/1978 | U.S.S.R. | 228/37 |

*Primary Examiner*—Samuel M. Heinrich
*Attorney, Agent, or Firm*—Steven R. Biren

[57] ABSTRACT

A method of wave-soldering assembled units which are conducted over a soldering unit by a transport device including propelling solder against the assembled units in a turbulent zone by a first turbulent soldering wave at an acute angle in the transport direction and subsequently by a quiet soldering wave approximately at right angles thereto. To avoid cold soldered spots and shadow regions, the method includes propelling solder against the assembled units by a second turbulent wave at an acute angle against the transport direction in the turbulent zone. A device for wave-soldering assembled units is also provided.

18 Claims, 2 Drawing Sheets

METHOD OF WAVE-SOLDERING ASSEMBLED UNITS

BACKGROUND OF THE INVENTION

1. Field of the Invention

The invention relates to a method of wave-soldering assembled units which are conducted over a soldering unit by a transport device, solder being propelled in a turbulent zone via a first, turbulent soldering wave at an acute angle in the transport direction and subsequently via a quiet soldering wave approximately at right angles against the assembled units. The invention also relates to an apparatus for carrying out this method.

2. Description of the Related Art

Methods of wave-soldering assembled units are known. The assembled units arranged on carriers are conducted over the soldering units, for example, by means of a transport belt. The soldering unit has so-called soldering waves which are directed transverse to the transport direction and which consist of liquid solder, wetting the assembled units to be soldered from below. The liquid solder is transported by a pump from a bath into a shaft or drum provided with a slot, so that solder emerges in the form of a film and assumes the shape of a soldering wave.

Known apparatuses of this kind usually comprise a so-called turbulent soldering wave (jet wave or chip wave) in which the liquid solder emerges at an acute angle in the transport direction of the assembled units and wet the latter from below with the solder. Due to the high flow velocity of the solder sprayed against the positions to be soldered at an acute angle, a so-called shadow effect occurs, i.e. there will be positions which are not wetted with solder. Furthermore, short-circuit bridges are created in this process which are eliminated again in the subsequent quiet soldering wave (lambda wave). This so-called lambda wave is flat and removes the solder, which has not yet cooled down, from the short-circuit bridges again. The lambda wave does indeed remove the undesirable short-circuit bridges, but the unsoldered shadow positions remain, so that unsoldered or coldly soldered positions are created.

To avoid such drawbacks, in the present art, the carriers with the assembled units welded in the first passage are passed through the apparatus a second time, but rotated through 180°, so that now the positions which were in the shadow in the first passage are wetted by the turbulent soldering wave hitting them at the acute angle. Clearly, such a method is very time-consuming and elaborate.

European Patent Application No 621,101 discloses a method and an apparatus for soldering assembled units in a non-oxidizing gas atmosphere. The solder is apparently supplied to the assembled units in a quiet wave at right angles, and is discharged to both sides. Similar devices are described in U.S. Pat. No. 5,228,614 and 5,292,055, which also show exclusively a quiet soldering wave in which the solder is supplied to the assembled units at right angles.

SUMMARY OF THE INVENTION

The invention has for its object to improve a method of the kind mentioned in the opening paragraph such that a reliable soldering of all positions is safeguarded in a shorter process time.

According to the invention, solder is supplied in the turbulent zone also via a second turbulent soldering wave at an acute angle against the assembled units, against the transport direction thereof. Thus in a single process step solder is transported against the assembled units at an acute angle both in the transport direction and against the transport direction. This eliminates the risk of shadow positions arising, where no wetting by means of solder can take place. Wetting is achieved in a single process step, so that a second passage is no longer necessary. The undesirable short-circuit bridges are removed, in a known manner, in the subsequent quiet soldering wave.

In an embodiment of the invention, the solder is propelled against the assembled units in the turbulent zone, seen in transport direction, first against and then in the transport direction. Equally good results are achieved when in reverse order the solder is propelled against the assembled units in the turbulent zone, seen in transport direction, first in and then against the transport direction. It is important in either case that the two soldering waves are at the same level relative to the assembled units, so that it is safeguarded that the tips of the soldering waves are in equal contact with the assembled units.

The invention further relates to an apparatus comprising a transport device for the assembled units to be soldered, a device for generating a quiet soldering wave and a device for generating a turbulent soldering wave in which the solder is propelled against the assembled units at an acute angle in transport direction via a first nozzle. A second nozzle for generating a turbulent soldering wave is provided from which the solder emerges at an acute angle in a direction opposed to the transport direction and is propelled against the assembled units. This additional nozzle may be formed, for example, as a separate, independent component. In an embodiment of the invention, however, the two nozzles for generating the turbulent soldering waves are constructed as a unit with a joint solder feed and a joint pump for transporting the solder, and a divided shaft is provided extending over the full width of the soldering track and comprising the two nozzles for propelling the solder in and against the transport direction.

This results in a compact, space-saving construction for generating the two turbulent soldering waves in a single apparatus. Only one transport pump for the solder is provided for the two soldering waves. Given a correct construction, shape, and positioning of the nozzles, two soldering waves will arise which are mutually attuned and attuned to the assembled units to be soldered. The liquid solder in the first soldering wave is propelled from the first nozzle at an acute angle against the assembled units in the transport direction. The liquid solder in the second soldering wave is propelled against the assembled units through the second nozzle at an acute angle in the opposite direction.

In a further embodiment of the invention, the divided shaft comprises a knife-edge strip whose tip together with a fixed strip forms a first nozzle, while the knife-edge strip is provided with a second opening which forms a second nozzle for the issuing solder. This construction has the advantage that the knife-edge strip can simply replace a component which was used in known constructions for forming only a single nozzle. Further constructional changes are not necessary then.

According to a further embodiment of the invention, the two nozzles which narrow from the inside to twards the outside are mutually attuned such that, when solder is provided by a pump, the mutually opposed soldering waves issuing from the two nozzles lie substantially at the same level in relation to the transport belt. An even wetting of the assembled units to be soldered is safeguarded thereby.

BRIEF DESCRIPTION OF THE DRAWINGS

For a fuller understanding of the invention, reference is had to the following description taken in connection with the following drawings, in which.

Generally, FIGS. 1 to 3 diagrammatically show embodiments of the object of the invention and in particular.

DETAIL DESCRIPTION OF THE PREFERRED EMBODIMENTS

Figure 1:
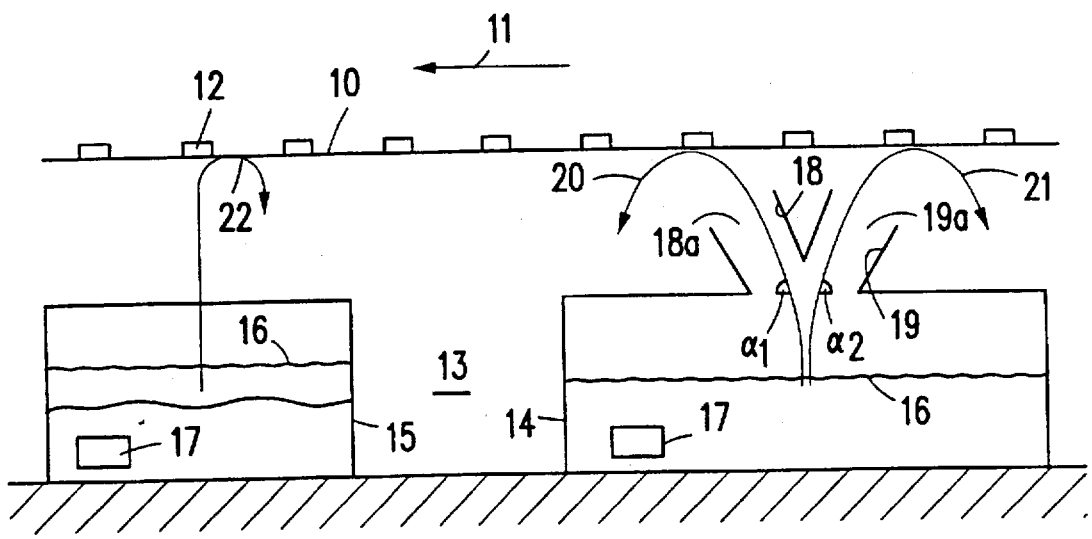
FIG. 1 diagrammatically shows an apparatus for wave-soldering assembled units.

The soldering apparatus of FIG. 1 comprises a transport belt 10 on which assembled units 12 to be soldered are transported in a direction 11. During this transport, the assembled units 12 are conducted over a soldering arrangement 13 which comprises two reservoirs 14, 15 with liquid solder 16. In the first reservoir 14, the solder 16 is transported by a pump 17 on the one hand to a nozzle 18 and on the other hand to a nozzle 19, so that the issuing solder 16 forms so-called soldering waves 20, 21 at the narrowed outlets 18a, 19a, respectively. The soldering waves wet the lower sides of the assembled units 12 to be soldered with their upper tips and provide them with solder. The soldering wave 20 emerges at an acute angle $\alpha 1$ and is thrown against the assembled units 12 in the transport direction 11. The soldering wave 21 issues at an acute angle $\alpha 2$ and is thrown against the assembled units 12 against the transport direction 11. This construction achieves that no shadow regions can arise at the lower sides of the assembled units to be soldered. After the assembled units have traversed the turbulent soldering waves 20, 21, they enter the quiet soldering wave 22 by which any short-circuit bridges created in the first soldering step are removed. Whereas the soldering waves 20, 21 issue with a high flow velocity, the soldering wave 22 shows a quiet and slow movement.

Figure 2:
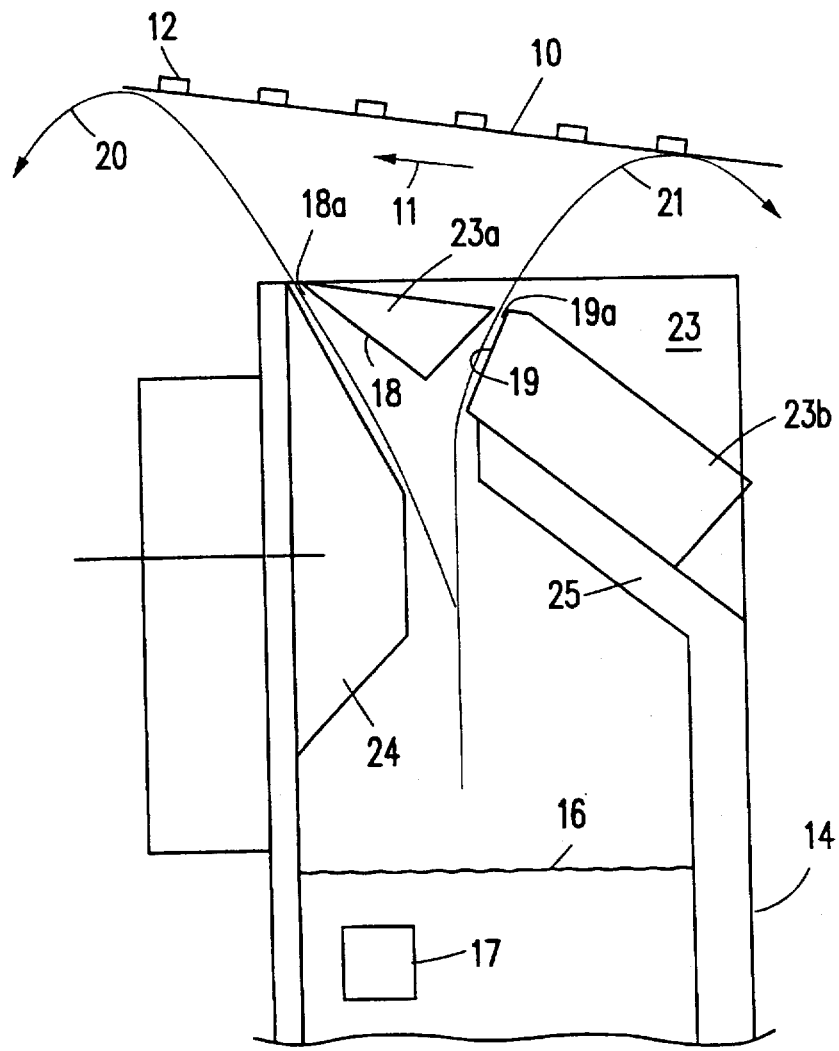
FIG. 2 shows a dual-nozzle arrangement according to the invention for generating two soldering waves in opposite directions.

The construction of the nozzles 18, 19 is diagrammatically depicted in side elevation in FIG. 2. The narrowing nozzle 19 with the outlet 19a is formed in a knife-edge strip 23 which comprises two parts 23a,b. The other narrowing nozzle 18 with its outlet 18a is formed by a fixed strip 24 and the part 23a. The dual knife-edge strip 23a is fastened to a fixed carrier 25.

Figure 4:
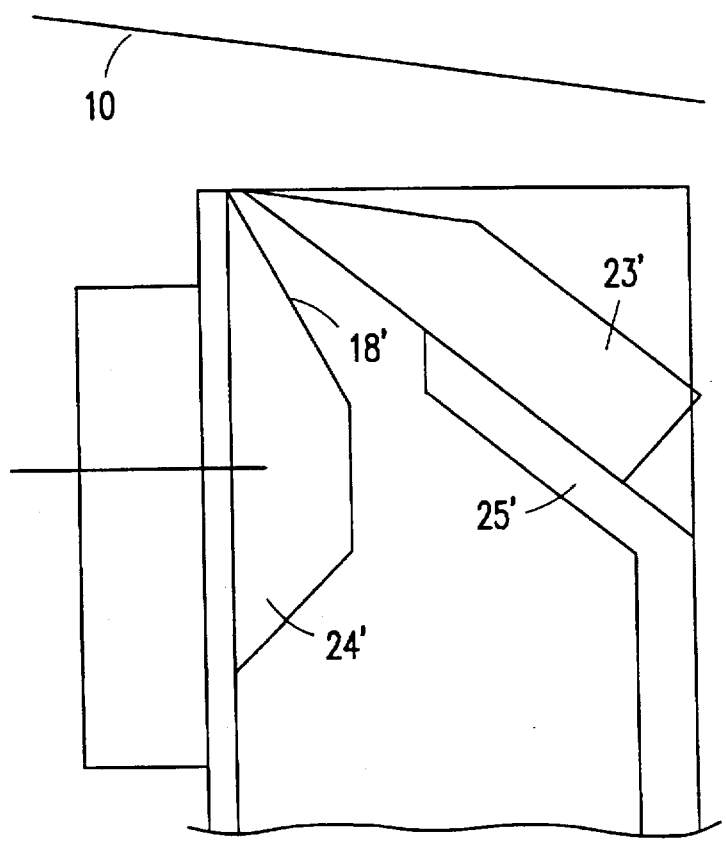
FIG. 4 shows a known nozzle arrangement for generating a single soldering wave constructed in accordance with the prior art.

By way of contrast, FIG. 4 shows a prior-art construction where the knife-edge strip 23' is formed as a single component which forms only a single nozzle 18' together with the fixed strip 24'.

Figure 3:
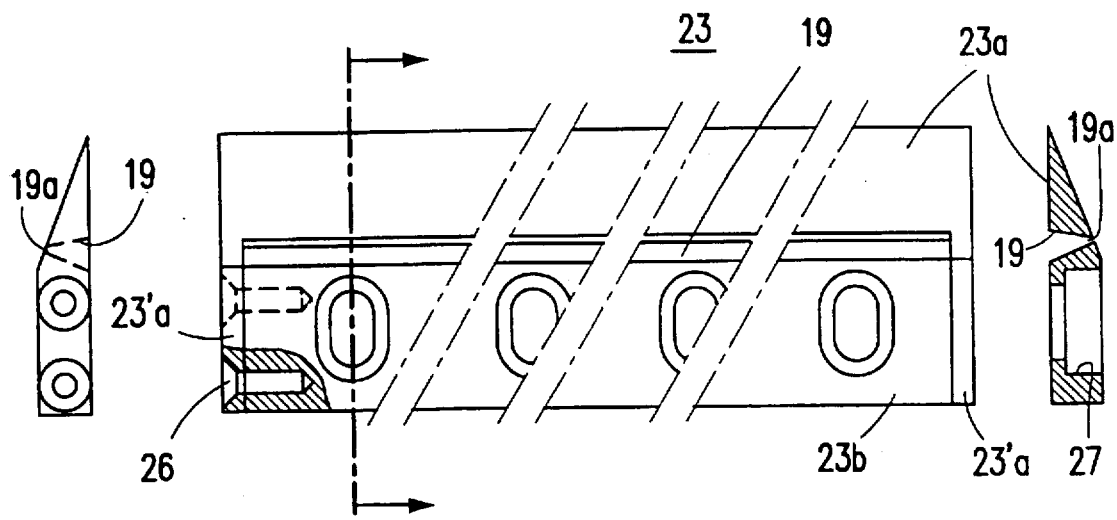
FIG. 3 shows three views of a component according to FIG. 2.

The knife-edge strip 23 of FIG. 1 is shown in FIG. 3 in plan view, in side elevation, and in lateral cross-section. The projecting part 23a is fastened to the part 23b via two arms 23'a by means of screws 26. Slotted holes in the arms 23'a render it possible to modify the size of the nozzle 19 and thus the size of the outlet opening 19a. The same can be done for the nozzle 18 through relative shifting of the components 23 and 24 (FIG. 3). Reference numeral 27 denotes bores for fastening the knife-edge strip on the carrier 25.

The knife-edge strip 23 according to the invention offers the advantage that two mutually independently adjustable soldering waves can be generated thereby which facilitate an optimum soldering of the components. Furthermore, such a knife-edge strip can be easily interchanged with a commercially available standard strip.

I claim:

1. A method of wave-soldering assembled units which are conducted over a soldering unit by a transport device, solder being propelled in a turbulent zone via a first, turbulent soldering wave at a fixed acute angle in the transport direction and subsequently via a quiet soldering wave approximately at right angles against the assembled units wherein the solder is supplied in the turbulent zone also via a second turbulent soldering wave at a fixed acute angle against the assembled units, against the transport direction thereof.

2. The method as claimed in claim 1, wherein the solder is propelled against the assembled units in the turbulent zone, seen in transport direction, first against and then in the transport direction.

3. The method as claimed in claim 1, wherein the solder is propelled in the turbulent zone, seen in transport direction, first in and then against the transport direction.

4. An apparatus for wave soldering an assembled unit, said apparatus comprising:

a transport device for transporting an assembled unit in a transport direction;

means for generating a quiet soldering wave;

means for generating a turbulent soldering wave in which the solder is propelled through a first nozzle in the transport direction at a fixed acute angle against the assembled unit; and a second nozzle for generating a second turbulent soldering wave in which the solder issues from the second nozzle at a fixed acute angle against the transport direction and is propelled against the assembled units unit.

5. The apparatus as claimed in claim 4, wherein the two nozzles for generating the turbulent soldering waves are constructed as a unit with a joint solder feed and a joint pump for transporting the solder, and a divided shaft extending over the full width of the soldering track and comprising the nozzles for propelling the solder in and against the transport direction.

6. The apparatus as claimed in claim 5, and including a fixed strip, wherein the divided shaft comprises a knife-edge strip having a tip, said tip and said fixed strip forming a first nozzle outlet, and the second nozzle outlet is formed within the knife-edge strip.

7. The apparatus as claimed in claim 6, wherein the knife-edge strip is subdivided into a projecting part and a base part, and wherein the projecting first part is connected to the base part by two arms to form the second nozzle outlet.

8. The apparatus as claimed in claim 7, wherein the projecting first part and base part are connected to one another by slotted holes and screws.

9. The apparatus as claimed in claim 6, wherein the knife-edge strip and the fixed strip are mutually adjustable.

10. The apparatus as claimed in claim 4, wherein the two nozzles narrow in the direction in which the solder is propelled and are mutually attuned so that when solder is provided by the pump, the mutually opposed soldering waves issuing from the two nozzle outlets lie substantially at the same level in relation to the transport belt.

11. The apparatus as claimed in claim 7, wherein the knife-edge strip and the fixed strip are mutually adjustable.

12. The apparatus as claimed in claim 8, wherein the knife-edge strip and the fixed strip are mutually adjustable.

13. A method of wave-soldering an assembled unit which is conducted over a soldering unit, said method comprising the steps of:

transporting an assembled unit in a transport direction;

propelling solder against an assembled unit at a fixed acute angle with respect to the transport direction;

propelling solder against an assembled unit at a fixed acute angle with respect to a direction opposite the transport direction; and propelling solder against an assembled unit at an angle which is at least essentially orthogonal to the transport direction.

14. The method as claimed in claim 13, including the steps of first propelling solder against an assembled unit at an acute angle with respect to the transport direction and thereafter propelling solder against an assembled unit at an acute angle with respect to a direction opposite the transport direction.

15. The method as claimed in claim 13, including the steps of first propelling solder against an assembled unit at an acute angle with respect to a direction opposite the transport direction and thereafter propelling solder against an assembled unit at an acute angle with respect to the transport direction.

16. An apparatus for wave-soldering an assembled unit, said apparatus comprising:

a transport device for transporting an assembled unit in a transport direction;

means for generating a quiet soldering wave which is propelled against an assembled unit;

a first nozzle for propelling solder against an assembled unit at a fixed acute angle with respect to the transport direction; and a second nozzle for propelling solder against an assembled unit at a fixed acute angle with respect to a direction opposite the transport direction.

17. The apparatus as claimed in claim 16, and including a joint pump and a joint solder feed connected to the first and second nozzles for transporting the solder; and a divided shaft extending over the full width of a soldering track for propelling the solder in a direction towards an assembled unit.

18. The apparatus as claimed in claim 17, and including a fixed strip and wherein the divided shaft comprises a knife-edge strip having a tip, said tip and said fixed strip forming a first nozzle outlet of said first nozzle and wherein a second nozzle outlet of said second nozzle is formed within said knife-edge strip.

* * * * *